United States Patent [19]

Le Salver et al.

[11] 4,159,091

[45] Jun. 26, 1979

[54] DAMPER DEVICE, IN PARTICULAR FOR THE SUSPENSION OF AN ENGINE

[75] Inventors: Robert Le Salver, Chanteloup les Vignes; Dominique Poupard, Versailles, both of France

[73] Assignee: Automobiles Peugeot, Paris, France

[21] Appl. No.: 808,519

[22] Filed: Jun. 21, 1977

[30] Foreign Application Priority Data

| Jun. 30, 1976 | [FR] | France | 76 19941 |
| Nov. 26, 1976 | [FR] | France | 76 35722 |
| Dec. 21, 1976 | [FR] | France | 76 38526 |
| May 5, 1977 | [FR] | France | 77 13765 |
| May 26, 1977 | [FR] | France | 77 16131 |

[51] Int. Cl.² ............................................. F16M 5/00
[52] U.S. Cl. .................................. 248/562; 248/634; 267/113
[58] Field of Search .................. 248/9, 18, 20, 358 R, 248/54, 60; 267/113, 65 A; 188/1 B

[56] References Cited

U.S. PATENT DOCUMENTS

| 2,387,066 | 10/1945 | Harding | 248/358 R |
| 2,457,749 | 12/1948 | Thiry | 248/358 R |
| 2,705,118 | 3/1955 | Beck | 248/358 R X |
| 2,919,883 | 1/1960 | Murphy | 248/358 R |
| 3,109,520 | 11/1963 | Vossieck | 267/113 X |
| 3,606,296 | 9/1971 | Chassagne | 267/113 |

*Primary Examiner*—J. Franklin Foss
*Attorney, Agent, or Firm*—Burns, Doane, Swecker & Mathis

[57] ABSTRACT

The device comprises two armatures one of which is for connection to a support and the other is for connection to a suspended element. A block of elastic material is interposed between, and defines with, the two armatures a closed enclosure. A partition wall provided with at least one calibrated orifice is mounted by the periphery thereof on a first of the armatures and divides the enclosure into two chambers. A liquid fills one of the chambers and at least a part of the other chamber. The partition wall has a part which is movable with respect to the first armature in a direction perpendicular to the mean plane of the partition wall. The first armature has a stop for limiting the extent of the movement of the partition wall.

17 Claims, 25 Drawing Figures

FIG_1

FIG_2

FIG_3

FIG_4

DAMPER DEVICE, IN PARTICULAR FOR THE SUSPENSION OF AN ENGINE

The present invention relates to damper or shock-absorber devices for connecting to a rigid support a vibrating element or assembly which is subjected to excitations of different types.

One application may be in particular in a vehicle in the elastic suspension of a heat engine relative to the structure. In an automobile vehicle, the elastic block structures employed for the suspension of the engine have for principal function to filter the vibrations due to imperfections in the balancing of the engine. In this respect, the block structures must have high flexibility. Unfortunately this high flexibility results in a considerable impairment of the comfort under the effect of low-frequency trembles which are produced by the road and are transmitted owing to an insufficient damping.

This is why it has been proposed to associate a flexible elastic block structure with a damper, but these arrangements are expensive and inefficient in the damping of oscillations of small amplitudes owing to the mechanical frictions in the dampers. Moreover, the placement of the dampers may be particularly difficult in the small amount of space available in an engine compartment.

More interesting arrangements consist in incorporating hydraulic damping means within the block structure itself by employing the deformations of the support itself for displacing a liquid through a calibrated orifice. However, even these arrangements are not fully satisfactory since they do not sufficiently take into account the existence of vibrations of different amplitudes or are sensitive to the ageing of the materials involved in their construction and therefore do not have a reliable performance over a period of time.

An object of the invention is to provide a damper device which has a differential stiffness in accordance with the amplitude of the vibrations to which it is subjected while being of simple construction and very reliable in operation.

This result is obtained in a damper device comprising two armatures one of which is connected to a support and the other to a suspended element or sub-assembly, a block of an elastic material interposed between the two armatures and defining therewith a closed enclosure, a partition wall provided with at least one calibrated orifice mounted at the periphery of the partition wall on one of the armatures and dividing said enclosure into two chambers, the first of which chambers and at least a part of the second of which chambers being filled with a liquid, wherein at least a part of the partition wall is arranged in such manner as to be movable with respect to the armature on which it is mounted in a direction perpendicular to the mean plane thereof, the last-mentioned armature comprising means for limiting the amplitude of said movement.

Many embodiments will now be described with reference to the accompanying drawings in which.

Figure 1:
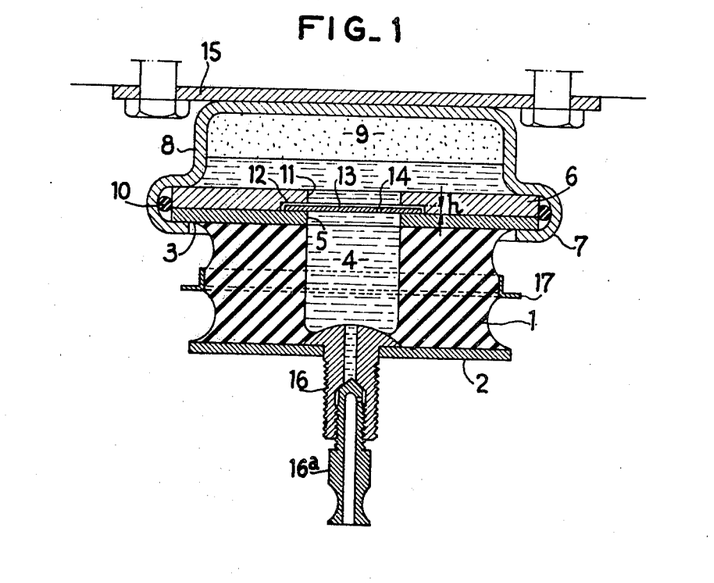
FIG. 1 is a sectional view of an elastic block structure according to the invention.

The elastic block structure shown in FIG. 1 comprises a block of elastomer 1 bonded to two armatures 2 and 3. The block 1 defines a first chamber 4 which communicates with an opening 5 in the armature 3.

A counterplate 6 is set in the armature 3 by the formed-over edge portions 7 of a rigid cap 8 which defines a second chamber 9. A sealing element 10 provides a seal with respect to the exterior in the region of the setting of the counterplate 6. The counterplate 6 has an opening 11 which corresponds to the opening 5 of the armature 3. A recess 12 concentric with the opening 11 is formed in the counterplace 6 adjacent to the armature 3 for defining a cavity and receiving a plate 13. The latter is thin and light but rigid. It may be made, for example, from aluminium or a hard plastics material. The thickness thereof is less than the height h of the recess 12, the clearance being at least equal to the amplitude of the relative displacements imparted thereto by the vibrations to be filtered. This clearance is of the order of a few tenths of a millimeter in the considered application. However, it must be understood that the magnitude thereof depends in particular on the nature of the elastomer employed in the construction of the block structure. A calibrated orifice 14 formed in the plate 13 puts the two chambers 4 and 9 permanently in communication with each other.

Welded to the cap 8 is a plate 15 to which is fixed a vibration-generating element, for example an engine (not shown) of an automobile vehicle. Fixed to the armature 2 is a hollow screw 16 including a device 16a for filling and plugging. This screw 16 is employed for securing the block structure on a rigid support, for example the structure (not shown) of an automobile vehicle. Preferably, one or more metal rings 17 are externally bonded to the block 1.

The damper device constructed in this way is partially filled with a given volume of liquid which is introduced by compressing at a pressure of a plurality of bars the air initially contained in the chambers 4 and 9. The volume of liquid introduced is such that, in the position of use, the plate 13 is completely immersed in the liquid, the air being located in the outer part of the second chamber 9.

The block structure just described operates in the following manner:

In respect of vibrations coming from the engine which are of very small amplitude (higher than 30 Hz), the displacement of the plate 13 roughly perpendicular to the mean plane thereof compensates for the deformations of the elastomer block 1 and the variation in the volume of the chamber 4, so that there is substantially no transfer of liquid from one chamber to the other. The stiffness of the block structure is then very low and an excellent filtering is achieved.

Under the effect of the trembles produced by the unevenness of the surface of the road of a frequency of the order of 10 to 15 Hz, the amplitude of the relative movements (exceeding about 0.5mm) produces deformations of the block 1 which can no longer be compensated for by the play of the plate 13 in its cavity. As soon as the plate 13 is in abutment, the block structure operates substantially as if the elastomer block were solid and the chamber 4 did not exist, which very considerably increases its stiffness. In this case, the braking or retarding of the flow of liquid through the orifice 14 provides a beneficial damping for the attenuating the relative movement.

The ratio between the stiffness corresponding to the aforementioned two types of stresses, which is desired to be as high as possible, is increased by the presence of the rings 17 the function of which is to transfer to the chamber 4 the deformations undergone by the elastomer block.

In respect of very slow deformations at a frequency lower than 1 Hz, the orifice 14 ensures an instantaneous rebalancing of the pressures between the two chambers 4 and 9, the stiffness of the block structure remaining low irrespective of the amplitude of the deformation.

Figure 2:
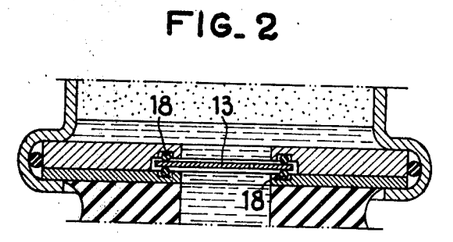
FIGS. 2 and 3 are partial views of two modifications.

The block structure shown in FIG. 2 differs from the the foregoing structure only in the presence of a two O-rings 18 of low stiffness disposed on each side of the plate 13. In this case the two chambers 4 and 9 intercommunicate solely by way of the orifice 14 and consequently by way of a perfectly precise passage section and noises from a metal-to-metal contact are avoided.

Figure 3:
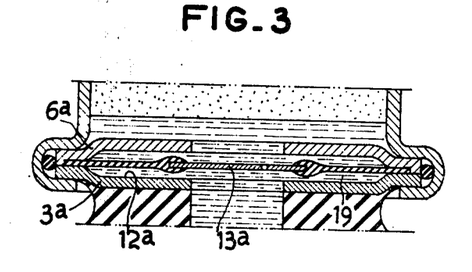

In the modification shown partly in FIG. 3, the plate 13 is bonded to the centre of a flexible diaphragm 19 which is clamped on the peripheral portion thereof between the armature 3a and the counterplate 6a. These two members have a section in the form of a Ω and define a cavity 12a of larger size than in the foregoing embodiments, the distance between the confronting faces of the armature and the counterplate being so chosen as to provide sufficient play for the movements of the plate 13a. This modification operates in the same way as the foregoing modifications.

Figure 4:
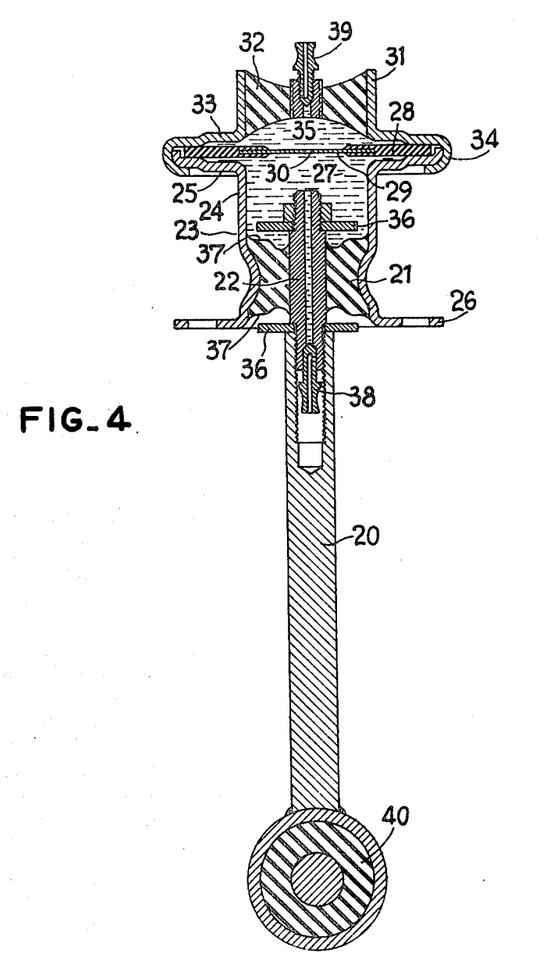
FIG. 4 is a sectional view of a block structure according to the invention associated with a connecting rod.

FIG. 4 shows a block structure according to the invention associated with a connecting rod or link 20 which may be, for example, a connecting rod between an engine and the body of a vehicle. In this application, the block structure comprises an elastic sleeve 21 bonded to an inner armature 22 and an outer armature 23. The outer armature is extended, at one end, by a cylindrical portion 24 and a flange 25 and, at the other end, by a flange 26 which is employed for fixing the structure to a rigid support, for example the body (not shown) of an automobile vehicle. The armature 23 and the sleeve 21 define a first chamber 27 which is closed by a flexible diaphragm 28 in the centre of which there is bonded a rigid plate 29 provided with a calibrated orifice 30.

A third armature 31, bonded to a disc 32 of elastomer, comprises a flange 33 the edge portions 34 of which are formed over onto the flange 25 and at the same time clamp the flexible diaphragm 28. the disc 32, the armature 31 and the diaghragm 28 define a second chamber 35. After this forming over, there remains between the plate 29 and the flanges 25 and 33 a clearance at least equal to the amplitude of the relative displacements imparted to the plate by the vibrations to be filtered. Disposed on each side of the central armature 22 are washers 36 which cooperate with stops 37 for limiting the movements. The chambers 27 and 35 are completely filled with a liquid under pressure by means of a filling device 38 and a bleeding device 39 so that it is possible to employ the block structure and consequently the connecting rod in any orientation. Fixed to the central armature 22 is one end of the connecting rod 20 the other end of which is fixed by an elastic articulation 40 to a part of an engine (not shown) of a vehicle.

The operation and the advantages of the block structure associated with the connecting rod 20 are the same as those of the block structure of the first embodiments described.

Figure 5:
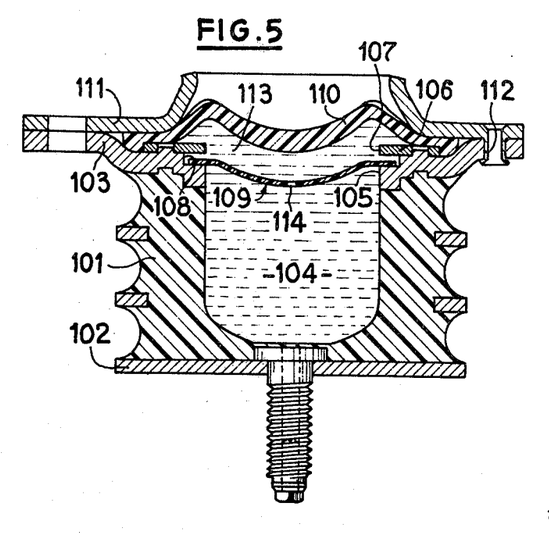
FIG. 5 is a sectional view of an elastic block structure comprising a partition wall according to the invention.

The elastic block structure shown in FIG. 5 comprises a block of elastomer 101 bonded to two armatures 102, 103. The block 101 defines a first chamber 104 which communicates with an opening 105 of the armature 103. Fixed to the latter by any suitable means is a counterplate 106 having an opening 107 which coincides with opening 105. A recess 108 of height h concentric with the opening 105 is formed in the armature 103 to define a cavity which receives a plate 109 defining the chamber 104. An elastic wall 110 is maintained by the peripheral portion thereof between the armature 103 and a flange 111 which is secured to the armature 103 for example by rivets 112. The elastic wall 110 defines with the plate 109 a second chamber 113. The chambers 104 and 113 intercommunicate by way of a calibrated orifice 114 in the plate 109 and are filled with an incompressible liquid.

Figure 6:
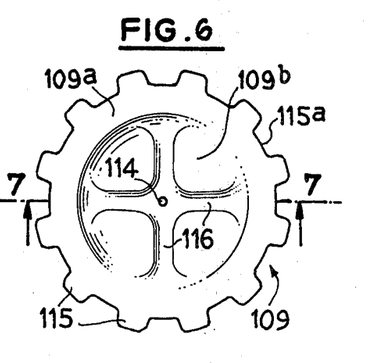
FIG. 6 is a top plan view of a first embodiment of the partition wall.
Figure 7:
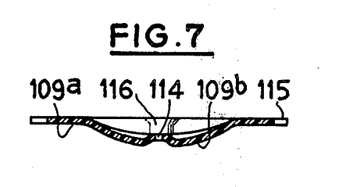
FIG. 7 is a sectional view taken on line 7-7 of FIG. 6.
Figure 8:
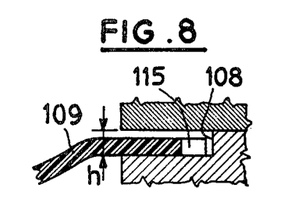
FIG. 8 is a view to an enlarged scale of the disposition of the partition wall shown in FIGS. 6 and 7 in the elastic block structure.

In a first embodiment illustrated in FIGS. 6 to 8, the plate 109 is made from a rigid plastics material which is chosen to ensure silent operation by avoiding noises which would result from the shocks of a metal partition wall against the edges of the cavity. This plate has, on one hand, a planer peripheral portion 109a provided with crenellations 115 defining notches 115a and, on the other hand, a crowned central portion 109b which is stiffened by ribs 116. As in the embodiment shown in FIG. 1, the thickness of the plate is less than the height h of the recess 108, the clearance being at least equal to the amplitude of the relative displacement imparted thereto by the vibrations to be filtered. The radial dimension of the crenellations 115 is less than the radial dimension of the recess 108 so that in the position of abutment on one side or the other, no communication is established between the chambers 104 and 113 by way of the periphery of the plate 109. The presence of the crenellations increases the free passage section and considerably facilitates the displacement of the liquid in the region of the abutment zones, which imparts an increased relative mobility to the partition wall in the cavity therefor.

Figure 9:
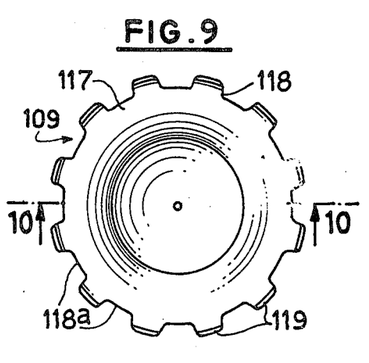
FIGS. 9-11 are views similar to FIGS. 6 to 8 in respect of a modification of the partition wall.
Figure 10:
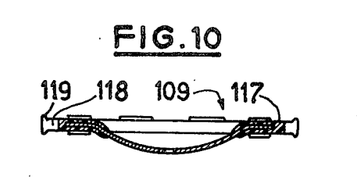
Figure 11:
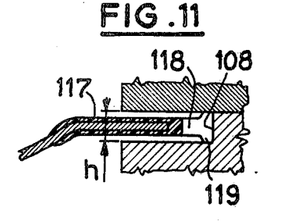

In FIGS. 9 to 11, the plate 109 is mainly of metal and the periphery therefor is embedded in a ring 117 of elastomer. Passages 118a are defined by crenellations 118 which perform the same function as the crenellations 115 of the preceding embodiment and are formed in this elastomer ring 117. The latter has a thickness less than the height h of the recess 108 but the outer edge of the crenellations 118 includes a beading 119 whose thickness in the free state slightly exceeds the height h. In this way, the plate 109 is maintained perfectly well in the cavity therefor and the freedom of the relative displacement in a direction perpendicular to the mean plane thereof results from the flexibility of the ring 117 in the region of the crenellations 118.

This embodiment also results in a particularly silent operation of the damper.

It will be understood that the shape, the number and the distribution of the peripheral passages formed in the partition wall may be modified in other ways. These passages may in particular be defined by orifices instead of notches which open alongside the periphery of the partition wall.

Figure 12:
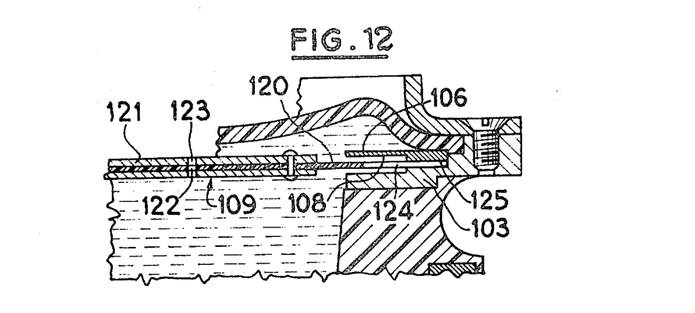
FIG. 12 is a view of a detail of another modification.

In the embodiment shown in FIG. 12 which is particularly simple in design and simple to manufacture, the partition wall 109 is constituted by a sheet of foil 120 having a thickness of a few tenths of a millimeter and secured in the central part thereof to two rigid armatures 121. The foil and the armatures are provided with aligned orifices 122 and 123. The sheet of foil has a crenellated periphery at 124 and its outer edge 125 is clamped between the armature 103 and the plate 106. The operation of this embodiment is the same as that of the preceding modifications: the deformable foil may move in a direction perpendicular to the plane thereof between two positions of abutment against confronting faces of the recess 108 and the crenellations facilitate the passage of the liquid from one chamber to the other.

Figure 13:
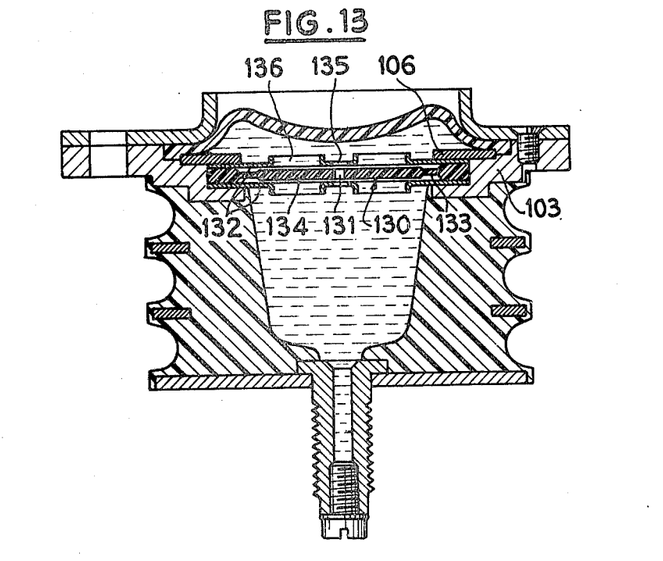
FIG. 13 is a sectional view of another embodiment.
Figure 14:
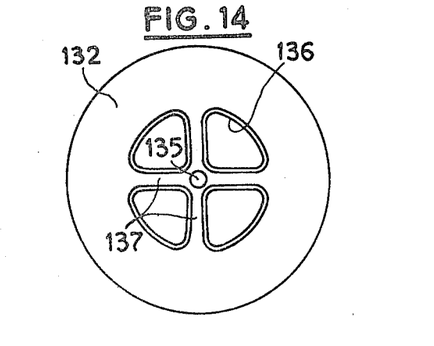
FIG. 14 is a plan view of an element of the embodiment shown in FIG. 13.

In the embodiment shown in FIGS. 13 and 14, a similar result is obtained by other means. The partition wall 109 comprises a plate 113 of rubber or other elastomer provided with an orifice 131 and disposed between two rigid members 132. The peripheral portion of the plate 130 is clamped between the members 132 and the assembly is secured between the armature 103 and the counterplate 106. The plate 130 has an intermediate thinner zone 133 and the central portion 134 thereof is received with a slight clearance between the two members 132. In the illustrated embodiment, the members 132 have a central orifice 135 and four pierced opening 136 separated by four branches 137. This structure operates in the following manner: the low stiffness characteristics is obtained by a small-amplitude deformation of the elastic plate 130. When the latter comes in contact with the adjacent member 132 it becomes substantially rigid and the highest stiffness characteristic is achieved, the damping effect being produced in the usual manner by the passage of the liquid through the orifice 131. The various component parts of this embodiment are very easy to manufacture and the operation thereof is particularly silent.

In the embodiments shown in FIGS. 5 to 14, the displacements of the liquid are facilitated in the zones of abutment of the partition wall in the cavity therefor and this imparts a higher relative mobility to the partition wall.

Figure 15:
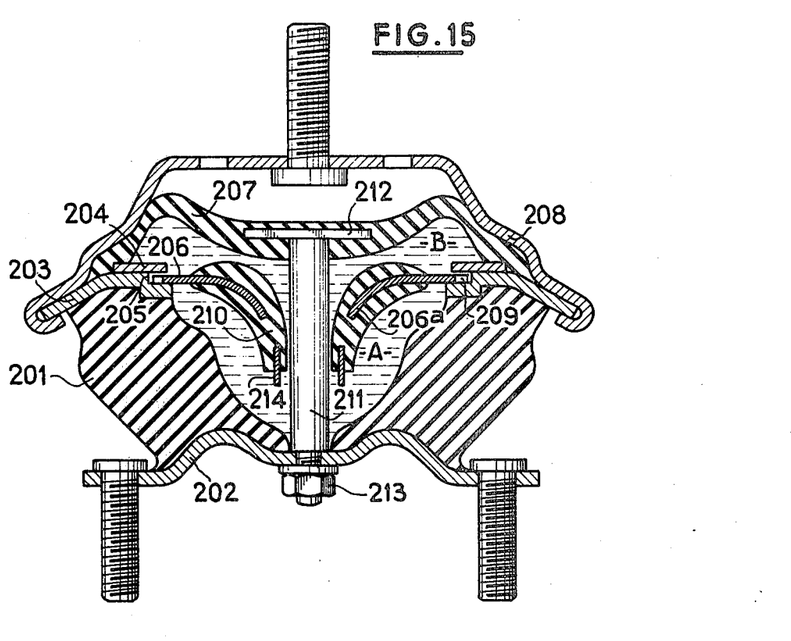
FIGS. 15 and 16 are sectional views of two other examples of application to elastic block structures more particularly intended for the suspension of an engine of an automobile vehicle.

The block structure shown in FIG. 15 comprises a block 201 of elastomer bonded to two armatures 202 and 203. A counterplate 204 secured to the armature 203 defines with the latter a recess 205 in which a partition wall 206 is received. An elastic wall 207 is held by the peripheral portion thereof by the forming of an armature 208 over onto the armature 203. The armature 208 is adapted to be connected to the engine and the armature 202 is secured to the structure of the vehicle. The partition wall 206 defines, with the block 201, a first chamber A and, with the wall 207, a second chamber B. The two chambers are filled with an incompressible liquide. The partition wall 206, which may advantageously have a crenellated peripheral portion 209, has a flared central portion 206a, the peripheral portion of which is embedded in a sleeve 210 of an elastic material. Extending inside the sleeve with a slight clearance is a rod 211 whose end has a head 212 embedded in the wall 207 and whose other end is secured to the armature 202 by a nut 213. A rigid ring 214, embedded in the elastic sleeve 210, has for purpose to maintain the shape of the central passage of the sleeve constant while enabling the sleeve to be centered on the rod 211.

The damper just described operates in the same way as those described hereinbefore, the clearance between the sleeve 210 and the rod 211 performing the function of the calibrated orifice putting the two chambers A and B in communication with each other. The sleeve 210 thus performs a double function: on one hand, it defines with the rod 211 the small-section orifice putting the two chambers in communication with each other and, on the other hand, it ensures the centering with respect to the rod 211 when the damper is deformed under the effect of the stresses to which it is subjected.

However, an additional function and advantage result from the connection between the wall 207 and the armature 208 by way of the rod 211 which precludes one of the chambers A and B from being put under suction with no necessity to provide an initial high compression of the liquid. A particularly silent operation is moreover obtained.

Figure 16:
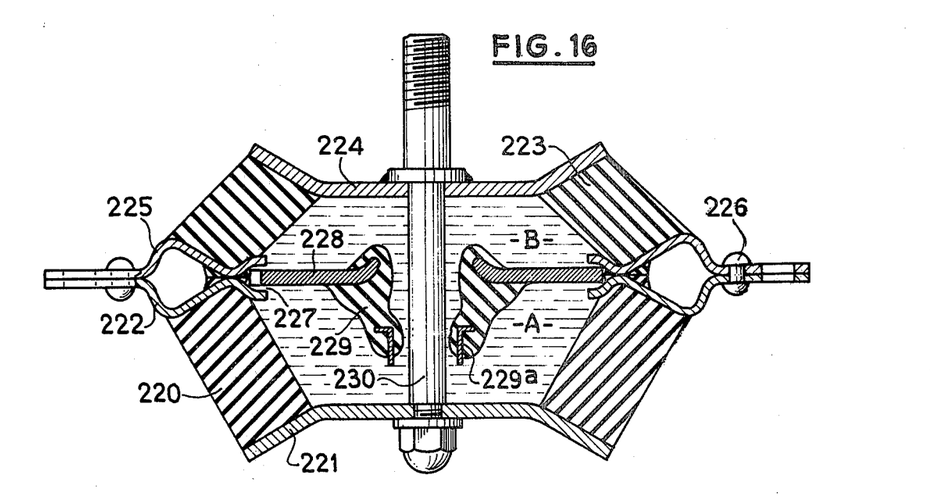

The elastic block structure shown in FIG. 16 comprises a block 220 of elastomer bonded to two armatures 221 and 222 and a block 223 of elastomer bonded to two armatures 224 and 225. The armatures 222 and 225 are rendered integral with each other by any known means, such as rivets 226. They define therebetween an annular cavity 227 in which a partition wall 228 is received. The latter defines, with the block 220 and the armature 221, a first chamber A and, with the block 223 and the armatures 224, a second chamber B, the two chambers being filled with an incompressible liquid. The partition wall 228 has a central opening the peripheral edge of which is embedded in a sleeve 229 of an elastic material through which extends with a slight clearance a rod 230 which is integral with the two armatures 221 and 224. The sleeve 229 has in the part thereof remote from the wall 228 an armature 229a. The rod 230 terminates in a screwthreaded portion for mounting the engine block or unit and the armatures 222 and 225 are secured to the structure of the vehicle.

This block structure operates in the same way as the preceding structure and has the same advantages.

Figure 17:
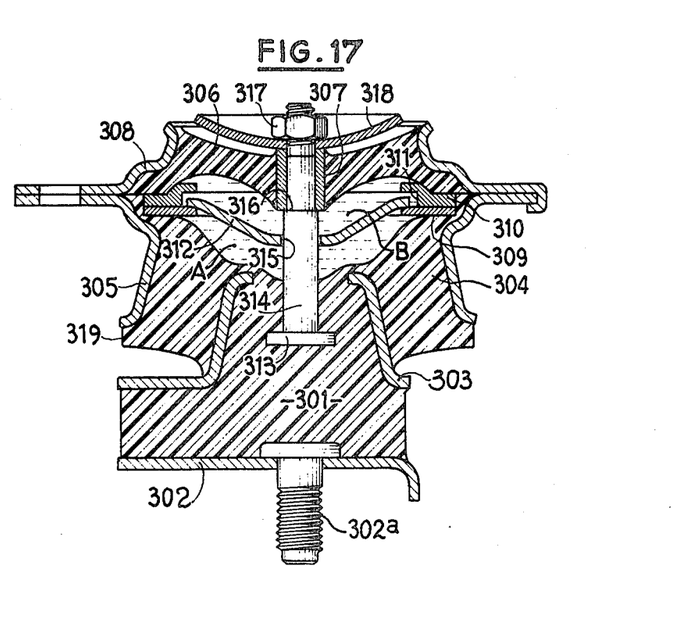
FIG. 17 is a sectional view taken on line 17-17 of the device shown in FIG. 18.
Figure 18:
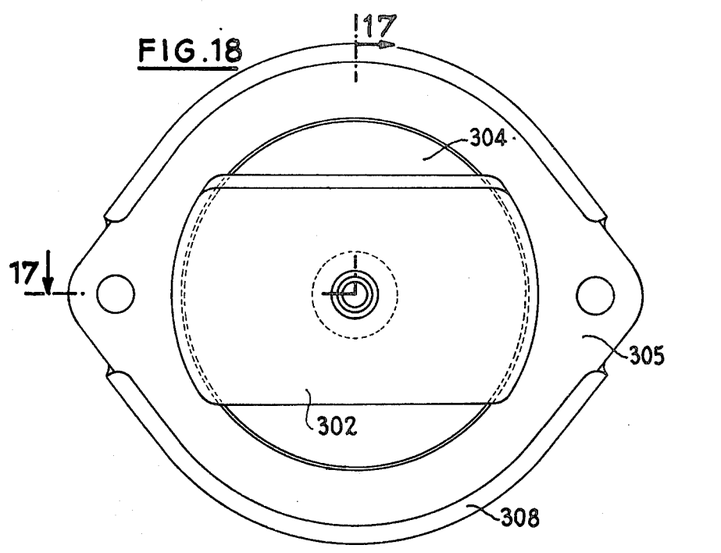
FIG. 18 is a top plan view of said device.

The block structure shown in FIGS. 17 and 18 comprises in particular an elastomer block 301 bonded to two armatures 302 and 303, a second elastomer block 304 bonded to the armature 303 and to an armature 305, and an elastic wall 306 bonded to an inner armature 307 and to an outer armature 308. The armature 302 is adapted to be fixed to the structure of an automobile vehicle by a bolt 302a and the armatures 305 and 308, which are interconnected by a forming over, are adapted to be connected to the engine (not shown) of the vehicle. The block of elastic material interconnecting the armature 302 and the armatures 305, 308 is in fact constituted by two blocks of elastomer 301 and 304. Clamped between the block 304 and the wall 306 are a plate 309 and a counterplate 310 defining a cavity 311 in which a rigid partition wall 312 is received with a radial and axial clearance. The partition wall 312 defines, with the blocks 304 and 301, a first chamber A and, with the wall 306, a second chamber B. The two chambers are filled with liquid. Embedded in the block 301 is a head 313 of a central rod 314 which extends with a slight clearance through an orifice 315 in the partition wall 312. This rod is blocked inside the armature 307 between a shoulder 316 and a nut 317, a sealing product being applied between the rod and the armature.

A washer 318 is clamped between the armature 307 and the nut 317. This washer acts as an extension stop for the damper in cooperation with the elastic wall 306. Inversely, a compression stop is provided by the cooperation between the periphery 319 of the block 304 and the armature 303.

The damper device just described operates in the same way as those shown in FIGS. 15 and 16. Indeed:

the axial clearance between the partition wall 312 and the cavity 311 allows a slight displacement of the partition wall in a direction perpendicular to the mean plane thereof;

the clearance between the orifice 315 of the partition wall 312 and the rod 314 constitutes the small-section passage putting the two chambers A ad B in communication with each other, the radial clearance of the partition wall 312 in the cavity 311 ensuring a centering between the partition wall and the rod;

the rod 314 interconnecting the block 301 and the partition wall 306 precludes putting one of the chambers under suction.

The device improved in this way has the following further advantages owing to the fact that the rod 314 is secured to no armature:

there is a possibility of angular movement between the armatures 302 and 305, 308 by rotation of the rod 314 in the block 301 about the centre of the head 313 or by rotation in the wall 306;

there is also a possibility of lateral displacement between the armatures 302, and 303, and therefore between the armatures 302 and 305, 308, by a shear stress of the part of the block 301 between the armatures 302 and 303.

Moreover, the incorporated stops limit the movement of the support both in extension and in compression.

Figure 19:
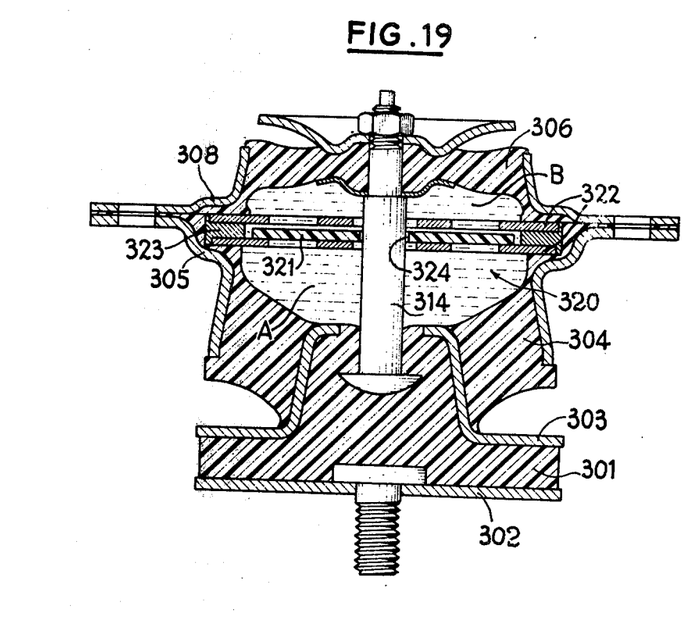
FIG. 19 is a axial sectional view of a modification.

The modification shown in FIG. 19 differs from the embodiment shown in FIGS. 17 and 18 only in the construction of the partition wall separating the chambers A and B. Like elements are designated in FIG. 19 by the same reference characters as in FIGS. 17 and 18. The partition wall 320 comprises a diaphragm of rubber 321 which is received with radial and axial clearance in a cavity defined by two gratings 322 blocked between the wall 306 and the block 304 and separated by a spacer member 323. The diaphragm 320 has a central opening 324 through which the rod 314 extends with a slight clearance.

The operation, which is the same as in the preceding embodiment, is here perfectly silent and any possible friction of the rod 314 on the diaphragm 321 presents no drawback.

FIGS. 20 to 25 show only the partition wall. The damper device in its entirety is as described hereinbefore.

Figure 20:
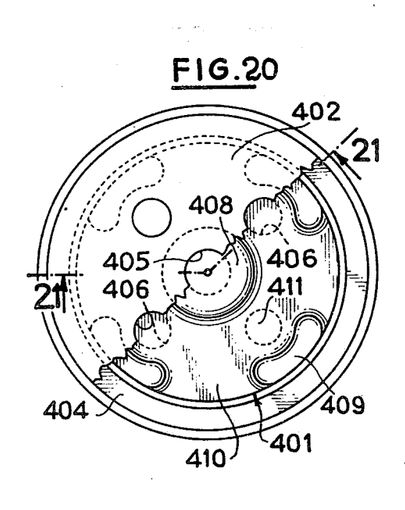
FIG. 20 is a plan view, with a part cut away, of another embodiment of the partition wall.
Figure 21:
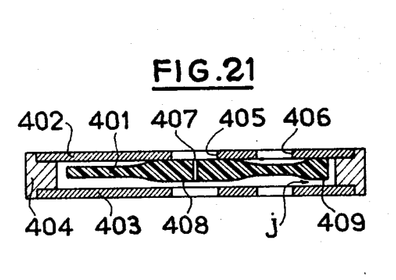
FIG. 21 is a sectional view taken on line 21—21 of FIG. 20.

FIGS. 20 and 21 show an elastic partition wall 401 of rubber or elastomer placed with a radial and axial clearance between two rigid elements or gratings 402, 403 which are maintained spaced apart from each other by a spacer-member 404. Each grating has openings 405, 406. The partition wall 401 has a calibrated orifice 407 located in the region of the openings 405 of the gratings 402, 403. The partition wall 401 has a general shape of a plate provided on each side with a central boss 408 and peripheral bosses 409 of a "haricot bean" shape. These bosses merge into the rest of the partition wall and each peripheral boss 409 partly surrounds an opening 406 of the gratings 402, 403. The thickness of the bosses 408 and 409 with respect to the distance between the gratings 402 and 403 determines the clearance j corresponding to the free relative movement of the partition wall without deformation thereof.

When the partition wall 401 is applied without deformation against one of the gratings 402 or 403, the bosses 409 define therebetween passages 410 and define with the central boss 408 passages 411.

An elastic support provided with a partition wall such as that described hereinbefore operates in the following manner:

In respect of small-amplitude vibrations, the displacement of the partition wall 401 between the armatures 402 and 403 without deformation compensates for the deformations of the support substantially without transfer of liquid from one side to the other of the partition wall. The stiffness of the support is then very low and ensures an excellent filtering as described before.

In respect of large-amplitude trembling, the partition wall 401 abuts against one of the gratings 402 and 403 and allows, in a first stage, the liquid possibility of flowing from one chamber to the other by way of the openings 406, the passages 410 and 411 and the peripheral clearance between the partition wall 401 and the spacer-member 404. Then, when the pressure difference between the two chambers of the support increases, the partition wall 401 is deformed and progressively obturates the passages 410 so that the final damping effect, which is reached progressively, is obtained by the lamination of the liquid by way of the sole orifice 407.

It can be seen, therefore, that with this improvement, the change from minimum stiffness to maximum stiffness occurs progressively and this is very advantageous in the obtainment of high comfort. By acting on the depth and width of the passages 410, 411, it is possible to choose at will the mode of variation of the damping effect during the transitional stage of operation.

Moreover, owing to the particular disposition of the bosses 408 and 409 with respect to the openings 406, the passages 410 are closed while a clearance still remains in the region of the passages 411 and the openings 406 between the partition wall 401 and the grating against which it is applied. This arrangement is very advantageous, since it still permits an excellent filtering to be obtained, even when the wall 401 bears against one of the gratings under the effect of a very low-frequency large-amplitude stress.

Figure 22:
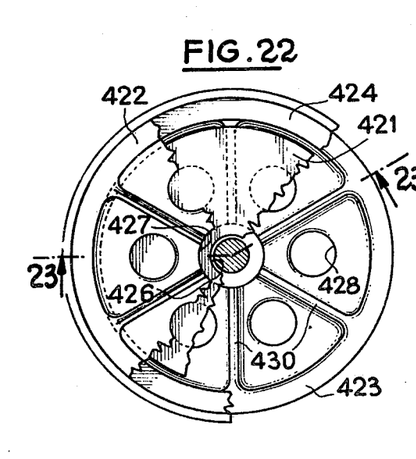
FIGS. 22 and 23 are similar views corresponding to another modification.
Figure 23:
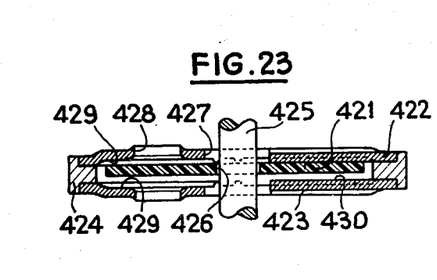

FIGS. 22 and 23 show an elastic plate 421 of rubber or elastomer interposed between two gratings 422 and 423 which are maintained spaced apart by a spacer-member 424. In this modification, the elastic support is of the type comprising a central rod 425 which interconnects the end walls of the chambers separated by the partition wall 421, but it is clear that each of the described embodiments is applicable to a support which has or does not have this rod. The plate 421 here has a constant thickness. It has a central orifice 426 for the passage of the rod 425 with a slight clearance. Each grating has a central opening 427 and peripheral openings 428. The surface of each of the gratings facing the plate 421 has recessed or hollow regions 429 which open onto the central opening 427 and extend beyond the periphery of the partition wall 421. The recessed regions 429 are disposed in the form of a clover and separated by radial ribs 430.

The operations is the same as for the preceding embodiment. When the partition wall 421 bears against one of the gratings, the liquid is capable of passing from one chamber to the other by way of the recesses 429, the openings 428 and the peripheral clearance between the partition wall 421 and the spacer-member 424. The recessed passages are closed progressively in starting at the periphery so that there are left, in the region of the openings 428, regions in which the abutment is deferred, as in the first embodiment.

Figure 24:
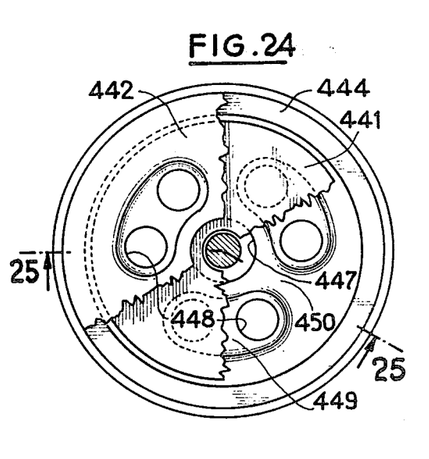
FIGS. 24 and 25 are also similar views of yet another modification.
Figure 25:
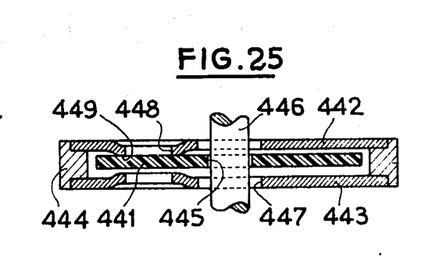

In the embodiment shown in FIGS. 24 and 25, an elastic plate 441 of constant thickness is interposed between two gratings 442 and 443 which are maintained spaced apart by a spacer-member 444. The plate 441 has a central orifice 445 for the passage of a central rod 446 with a slight clearance, this rod interconnecting the end walls of the chambers separated by the partition wall. Each grating has a central opening 447 whose section exceeds that of the orifice 445 and peripheral openings 448. The surface of each of the gratings facing the plate 441 has regions 449 in relief in each of which, for example, two orifices 448 are formed and which define therebetween passages 450.

The operation of this modification is comparable to that of the two preceding embodiments. When the partition wall 441 bears against one of the gratings, the orifices 448 of this grating are obturated but a transfer of liquid remains possible by way of the passages 450 and the central opening 447. The deformation of the partition wall 441 thereafter progressively obturates the passages 450, and the final damping action occurs by a lamination of the liquid through the calibrated leakage defined by the clearance between the rod 446 and the orifice 445.

However, with respect to the preceding two embodiments, this modification provides an improved control of the damping effect during the transitional stage, this damping occurring by lamination of the liquid between the rod 446 and the opening 447.

Having now described my invention what I claim as new and desire to secure by Letters Patent is:

1. A damper device, in particular for the suspension of an engine in a vehicle, said device comprising in combination a first armature and a second armature, one of which armatures is for connection to a support element and the other of which armatures is for connection to a suspended element or sub-assembly, a block of an elastic material interposed between the two armatures and defining therewith a closed enclosure, partition wall means having a mean plane and a peripheral portion and defining at least one calibrated orifice and mounted by the peripheral portion on the first armature and dividing said enclosure into two chambers, a liquid filling a first of said two chambers and at least a part of a second of said two chambers, the partition wall means being independent of said second armature and having a part which is movable with respect to said first armature in a direction perpendicular to the mean plane of the partition wall, the first armature comprising means for limiting the extent of said movement to a value less than substantially 0.5 mm.

2. A device as claimed in claim 1, wherein the partition wall means has an upwardly concave crowned shape.

3. A device as claimed in claim 2, wherein the partition wall means has a planar peripheral portion and a crowned central portion.

4. A device as claimed in claim 1, wherein the partition wall means defines adjacent the peripheral portion thereof passages for the liquid which passages are capable of being obturated when the partition wall means occupies either of two extreme positions of the partition wall means.

5. A device as claimed in claim 4, wherein the peripheral portion of the partition wall means has a crenellated shape, the radial dimension of the crenellations being less than the radial dimension of the cavity in which the partition wall means is movable.

6. A device as claimed in claim 5, wherein the crenellations are provided in a ring of elastomer which covers the peripheral portion of the partition wall means.

7. A device as claimed in claim 6, wherein the outer edge of each crenellation has a beading the thickness of which beading slightly exceeds, in the free state, the height of the cavity in which the partition wall means is movable.

8. A device as claimed in claim 1, comprising an armature plate and a counterplate which are integral with each other, the partition wall means being interposed between the plate and counterplate, and the plate and the counterplate each having an opening facing the partition wall means.

9. A device as claimed in claim 1, comprising rigid walls which are integral with the first armature, the second chamber being defined by the partition wall means and by the rigid walls, and the second chamber being partly filled with gas.

10. A device as claimed in claim 1, comprising an elastic wall which defines at least a part of the second chamber.

11. A damper device, in particular for the suspension of an engine in a vehicle, said device comprising in combination a first armature and a second armature, one of which armatures is for connection to a support element and the other of which armatures is for connection to a suspended element or sub-assembly, a block of an elastic material interposed between the two armatures and defining therewith a closed enclosure, partition wall means comprising a rigid plate which has a mean plane and a peripheral portion and defines at least one calibrated orifice, means connected to said first armature and defining a cavity which receives the peripheral portion of the rigid plate with an axial and radial clearance, the plate dividing said enclosure into two chambers, a liquid filling a first of said two chambers and at least a part of a second of said two chambers, the plate being movable with respect to said first armature in a direction perpendicular to said mean plane of the plate, said cavity limiting the extent of said movement.

12. A device as claimed in claim 11, comprising sealing elements disposed between two faces of the plate and adjacent surfaces of said cavity.

13. A damper device, in particular for the suspension of an engine in a vehicle, said device comprising in combination a first armature and a second armature, one of which armatures is for connection to a support element and the other of which armatures is for connection to a suspended element or sub-assembly, a block of an elastic material interposed between the two armatures and defining therewith a closed enclosure, partition wall means having a mean plane and a peripheral portion and provided with at least one calibrated orifice and mounted by the peripheral portion on the first armature and dividing said enclosure into two chambers, a liquid filling a first of said two chambers and at least a part of a second of said two chambers, the partition wall means having a part which is movable with respect to said first armature in a direction perpendicular to the mean plane of the partition wall, the first armature comprising means for limiting the extent of said movement, the chambers having end walls and a rigid rod extending through the partition wall means with a slight clearance and interconnecting the end walls.

14. A device as claimed in claim 13, comprising a flexible wall carried by one of the two armatures and a block of elastic material interconnecting the two armatures, the rigid rod extending between the flexible wall and the block of elastic material.

15. A device as claimed in claim 14, wherein said rod has a head embedded in the block of elastic material.

16. A device as claimed in claim 14, wherein said rod has a stop which is cooperable with the flexible wall for limiting an extension movement of the damper device.

17. A device as claimed in claim 14, wherein the block of elastomer has two parts and an intermediate armature is bonded to the two parts, the intermediate armature and one of the parts of the block constituting a stop which limits a compression movement of the damper device.

* * * * *